(12) United States Patent
Hirako et al.

(10) Patent No.: US 6,716,517 B2
(45) Date of Patent: Apr. 6, 2004

(54) ALUMINA SINTERED COMPACT AND METHOD OF PRODUCING THE SAME, AND ARTICLE FOR HEAT TREATMENT USING ALUMINA SINTERED COMPACT

(75) Inventors: Koichiro Hirako, Nagaokakyo (JP); Kenji Ueno, Nagaokakyo (JP); Tomonobu Suzuki, Nagaokakyo (JP)

(73) Assignee: Murata Manufacturing Co. Ltd, (JP)

( * ) Notice: Subject to any disclaimer, the term of this patent is extended or adjusted under 35 U.S.C. 154(b) by 365 days.

(21) Appl. No.: 09/838,844

(22) Filed: Apr. 20, 2001

(65) Prior Publication Data

US 2001/0044371 A1 Nov. 22, 2001

(30) Foreign Application Priority Data

Apr. 20, 2000 (JP) ........................................ 2000-119433

(51) Int. Cl.[7] ................................................ C04B 41/87
(52) U.S. Cl. ............. 428/216; 248/114.1; 425/DIG. 29; 428/212; 428/325; 428/336; 428/701; 428/702
(58) Field of Search .................. 428/212, 216, 428/701, 702, 325, 336; 425/DIG. 29; 249/114.1

(56) References Cited

U.S. PATENT DOCUMENTS 6,159,885 A * 12/2000 Mizuno et al.

FOREIGN PATENT DOCUMENTS

| JP | 63-182281 | * | 5/1988 |
| JP | 02-235571 | * | 9/1990 |
| JP | 4-231370 | | 8/1992 |
| JP | 07-083573 | * | 3/1995 |
| JP | 7-315915 | | 12/1995 |
| JP | 09-295872 | * | 11/1997 |
| JP | 09-301777 | * | 11/1997 |
| JP | 2000-128625 | | 5/2000 |

OTHER PUBLICATIONS

English abstract of JP 02–229776, no date.*

* cited by examiner

Primary Examiner—Archene Turner
(74) Attorney, Agent, or Firm—Dickstein, Shapiro, Morin & Oshinsky, LLP.

(57) ABSTRACT

An alumina sintered compact includes at least two layers including an internal layer and a surface layer formed on the surface of the internal layer, which internal layer is composed of alumina crystal grains formed by sintering of a fine alumina powder, and which surface layer is composed of alumina crystal grains formed by grain growth of a fine alumina powder and having a mean grain size larger than that of the alumina crystal grains of the internal layer. This alumina sintered compact can prevent the accumulation of PbO in a surface area while controlling the absorption of PbO.

12 Claims, 2 Drawing Sheets

ALUMINA SINTERED COMPACT AND METHOD OF PRODUCING THE SAME, AND ARTICLE FOR HEAT TREATMENT USING ALUMINA SINTERED COMPACT

BACKGROUND OF THE INVENTION

1. Field of the Invention

The present invention relates to an alumina sintered compact obtained by firing an alumina powder, and a method of producing the same, and an article for heat treatment using the alumina sintered compact.

2. Description of the Related Art

Alumina sintered compacts have satisfactory corrosion resistance and heat resistance and are generally used as firing tool materials such as boxes and cases or as tubes for heat treatment of items such as atmospheric gas supply tubes. This type of alumina sintered compacts includes a fine-grain-containing alumina sintered compact obtained by sintering a fine alumina powder, as described in Japanese Unexamined Patent Application Publication No. 4-231370, and an oriented alumina sintered compact obtained by firing a plate fine alumina powder to thereby the subject crystal grains to grain growth in layers, as described in Japanese Unexamined Patent Application Publication No. 7-315915.

However, when a ceramic article containing PbO, for example, is fired using a firing tool composed of the fine-grain-containing alumina sintered compact, the sintered compact is deteriorated due to the PbO, and the life of the firing tool or tube for heat treatment is shortened in some cases. This is probably because the crystal grains of the sintered compact are dense compacts of fine grains and therefore have a lot of grain boundaries and a large amount of PbO is absorbed by the grain boundaries. The strength and creep characteristics of the sintered compact are thus deteriorated to thereby invite warpage and deformation.

On the contrary, an oriented alumina sintered compact absorbs PbO less than the fine-grain-containing alumina sintered compact, as the crystal grains are formed by grain growth. However, repeated firing procedures of the oriented alumina sintered compact permit PbO to accumulate on a surface area of the sintered compact to thereby invite the following problems:

(1) The PbO absorption by the alumina sintered compact gradually decreases and the atmosphere varies every time the sintered compact is used.

(2) The sintered compact has a large amount of PbO on its surface, which PbO is liable to react with the ceramic article and adversely affects the quality of the ceramic article in some cases.

(3) PbO accumulated on the surface area expands and contracts in repeated heat cycles, and the crystal grains on the surface area may therefore peel or drop off to thereby invite the formation of a rough surface or depressions on the surface of the alumina sintered compact.

SUMMARY OF THE INTENTION

Under these circumstances, accordingly, an object of the present invention is to provide an alumina sintered compact that can prevent the accumulation of PbO on its surface while controlling the absorption of PbO, an article for heat treatment using the alumina sintered compact, and a method of producing the alumina sintered compact.

The present inventors made investigations on the crystal structure of an alumina sintered compact from the viewpoint of preventing the accumulation of PbO while controlling the absorption of, for example, PbO. They found that the corrosion resistance to, for example, PbO is improved when the surface area of the alumina sintered compact is composed of a layer of alumina crystal grains which have a large mean grain size and are obtained by grain growth, and that the accumulation of, for example, PbO on the surface area can be prevented by allowing the inside of the sintered compact to absorb and disperse PbO or the like attached to the surface area. The present invention has been accomplished based on these findings.

Specifically, the present invention provides, in an aspect, an alumina sintered compact which includes at least two layers including an internal layer and a surface layer formed on the surface of the internal layer. In the alumina sintered compact, the internal layer includes alumina crystal grains formed by sintering of a fine alumina powder, and the surface layer includes alumina crystal grains formed by grain growth of a fine alumina powder and having a mean grain size larger than that of the alumina crystal grains of the internal layer.

The alumina sintered compact of the present invention may be obtained, for example, by the following procedure. A high purity granular fine alumina powder which is readily sintered is admixed with a high purity plate fine alumina powder as a seed crystal and the resulting mixture is cast and molded using a mold to thereby yield a green compact. In the green compact, the plate fine alumina powder is oriented in the vicinity of the surface in layer parallel to the surface and the granular fine alumina powder is compacted inside the green compact. The green compact is then fired at a temperature of preferably about 1550° C. to 1750° C. to thereby form a surface layer and an internal layer, which surface layer is mainly composed of alumina crystal grains formed by grain growth of the plate fine alumina powder on the surface, and which internal layer is mainly composed of alumina crystal grains formed by compact bonding of the granular fine alumina powder. Additionally, the grain sizes of the alumina crystal grains on the surface area and the thickness of the surface layer can be controlled by changing the ratio of the plate fine alumina powder to the granular fine alumina powder.

In the alumina sintered compact of the present invention, the alumina crystal grains constituting the surface layer preferably have a mean grain size between about 50 $\mu$m and 1000 $\mu$m and the alumina crystal grains constituting the internal layer preferably have a mean grain size between about 1 $\mu$m and 50 $\mu$m.

The term "grain size" of alumina crystal grains as used herein means the average of the maximum diameter and the minimum diameter of each crystal grain in a cross section perpendicular to the surface layer of the resulting sintered compact.

The mean grain size of the surface layer preferably falls in a range from about 50 to 1000 $\mu$m. This is because satisfactory corrosion resistance may not be obtained if the mean grain size is less than about 50 $\mu$m, and strength may be deteriorated due to abnormal grain growth if it exceeds about 1000 $\mu$m. The mean grain size of the internal layer preferably falls in a range from about 1 to 50 $\mu$m. This is because an alumina crystal grain having a mean grain size of less than about 1 $\mu$m may not be significantly prepared and PbO or the like may not be effectively absorbed and dispersed if it exceeds about 50 $\mu$m.

In the invented alumina sintered compact, the surface layer preferably has a thickness between about 100 $\mu$m and 2000 $\mu$m.

If the thickness of the surface layer is less than about 100 $\mu$m, sufficient corrosion resistance may not be obtained, and if it exceeds about 2000 $\mu$m, PbO or the like may not be sufficiently absorbed by and dispersed into the internal layer to thereby invite the accumulation of PbO or the like on the surface area.

The aspect ratio of the alumina crystals of the surface layer in the invented alumina sintered compact is preferably between about 1:3 and 1:10. The term "aspect ratio" as used herein means the ratio of the length in thickness direction to the length in width direction of a layered alumina crystal grain.

The preferred aspect ratio is specified in a range from about 1:3 to 1:10. If the aspect ratio is less than about 1:3, satisfactory corrosion resistance may not be obtained, and if it exceeds about 1:10, strength may be deteriorated due to abnormal grain growth. Additionally, alumina crystal grains each having an aspect ratio within the above range, excluding crystal grains formed by abnormal grain growth, preferably occupy about 90% or more of the total alumina crystal grains.

In another aspect, the present invention provides an article for heat treatment which includes the invented alumina sintered compact.

Such articles for heat treatment according to the present invention include, for example, boxes, cases and other firing tool materials, refractory materials, atmospheric gas supply tubes, radiant tubes and other tubes for heat treatment.

In addition and advantageously, the present invention provides a method of producing an alumina sintered compact, which includes the steps of mixing fine alumina powder A and fine alumina powder B, which fine alumina powder A has a mean grain size between about 0.4 $\mu$m and 3.0 $\mu$m, contains plate $Al_2O_3$ grains and has a purity of 99% or more, and which fine alumina powder B has a mean grain size between about 0.3 $\mu$m and 2.0 $\mu$m and having a purity of about 99% or more; casting and molding the resulting mixture using a mold to yield a green compact; drying the green compact; and firing the dried green compact at a temperature between about 1550° C. and 1750° C.

The mean grain size of fine alumina powder A is specified in a range from about 0.4 to 3.0 $\mu$m. If the mean grain size is less than about 0.4 $\mu$m, the grains do not satisfactorily undergo grain growth, and if it exceeds about 3.0 $\mu$m, sinterability may be deteriorated. The mean grain size of fine alumina powder B is specified in a range from about 0.3 to 2.0 $\mu$m. If the mean grain size is less than about 0.3 $\mu$m, sintered density may be decreased, and if it exceeds about 2.0 $\mu$m, sinterability may be deteriorated.

The firing temperature is specified between about 1550° C. and 1750° C. because the grains may not sufficiently undergo grain growth if the firing temperature is lower than about 1550° C. and the grains may abnormally grow if it exceeds about 1750° C.

The weight ratio of fine alumina powder A to fine alumina powder B is preferably between about 1:9 and 4:6 inclusive. If the weight ratio exceeds about 4:6, the surface layer may have an excessively large thickness to thereby invite the grain growth of the overall alumina sintered compact in some cases. If the weight ratio is less than about 1:4, the surface layer may not have a sufficient thickness.

The invented alumina sintered compact can prevent the absorption of, for example, PbO by action of the surface layer. This configuration can prevent the strength and creep characteristics of the sintered compact from deterioration and can prolong its life when it is used as, for example, a firing tool material or a tube for heat treatment.

Even when PbO or the like accumulates on the surface area due to repeated firing procedures, the internal layer can absorb and disperse the accumulated matter to thereby prevent PbO or the like from accumulating in the vicinity of the surface area. This configuration can avoid adverse effects on the quality of a ceramic article due to a reaction between PbO or the like and the ceramic article, can prevent peeling and dropping off of crystal grains due to heat cycling and can improve the reliability of the quality. Additionally, the internal layer absorbs and disperses PbO or the like to thereby level the absorption of PbO or the like to thereby uniformize the atmosphere every time when the sintered compact is used. The reliability of the quality can also be improved also by this configuration.

A preferred alumina sintered compact of the present invention including a surface layer having a mean grain size between about 50 $\mu$m and 1000 $\mu$m and an internal layer with a mean grain size between about 1 $\mu$m and 50 $\mu$m can enhance the absorption and dispersion of PbO or the like in the internal layer while improving the corrosion resistance of the surface layer.

Another preferred alumina sintered compact of the present invention comprising a surface layer having a thickness between about 100 $\mu$m and 2000 $\mu$m can ensure the internal layer to absorb and disperse PbO or the like and can improve the corrosion resistance of the surface layer.

The invented alumina sintered compact as another preferred embodiment, in which the aspect ratio of the surface layer is between about 1:3 and 1:10, can avoid the deterioration of strength due to abnormal grain growth and can ensure the required two-layer structure and can improve the corrosion resistance to, for example, PbO.

When the invented alumina sintered compact is used as an article for heat treatment such as a firing tool material, refractory material or a tube for heat treatment, the corrosion resistance in repeated firing procedures of a ceramic article containing PbO or the like can be improved to thereby prolong the life of the article for heat treatment.

The invented method of producing an alumina sintered compact, in which plate alumina powder A and granular alumina powder B are subjected to casting-molding using a mold, can repetitively produce the invented alumina sintered compact including two layers composed of a surface layer formed by grain growth and an internal layer formed by fine dense grains.

DESCRIPTION OF THE PREFERRED EMBODIMENTS

The embodiments of the present invention will be illustrated in detail with reference to the attached drawings.

Figure 1:
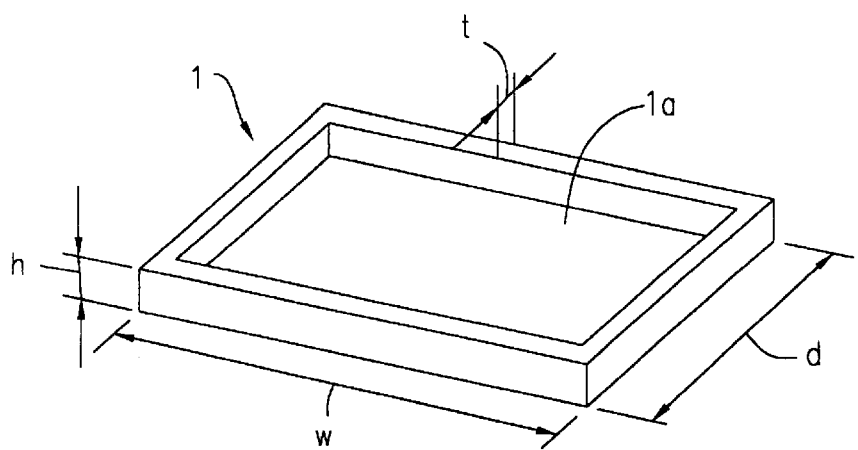
FIG. 1 is a perspective view showing a firing tool material composed of an alumina sintered compact as an embodiment of the present invention.
Figure 2:
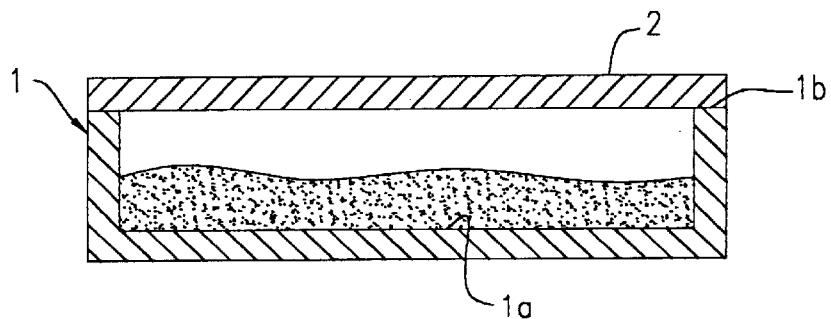
FIG. 2 is a sectional view of the firing tool material of FIG. 1.
Figure 3:
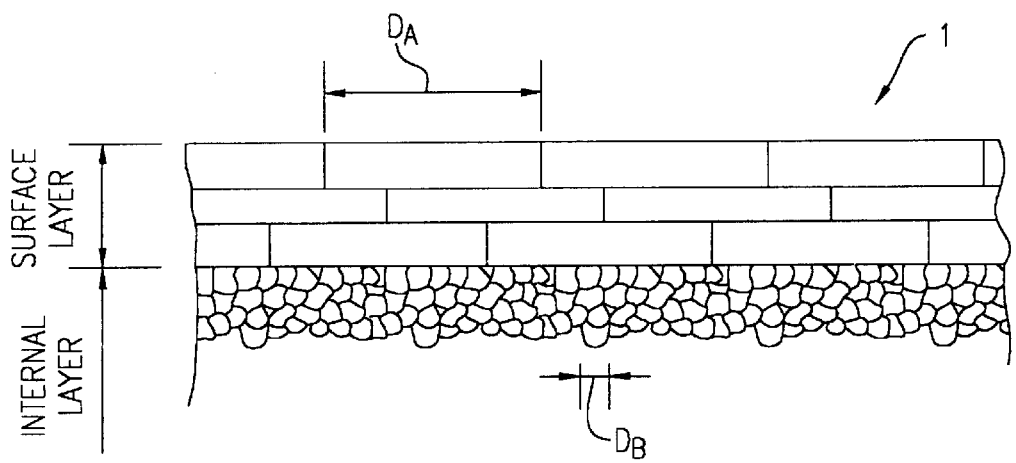
FIG. 3 is a schematic diagram showing the crystal structure of the firing tool material of FIG. 1 in cross section.

FIGS. 1 to 3 are diagrams showing an alumina sintered compact as an embodiment of the present invention, in which FIGS. 1 and 2 are a perspective view and sectional view of a firing tool material composed of the alumina sintered compact, and FIG. 3 is a schematic diagram showing the crystal structure of the firing tool material.

In the figures, firing tool material 1 is a box, case or the like, composed of an alumina sintered compact. Firing tool material 1 illustrated herein is in the form of a rectangular box and is used, for example, in heat treatment of a ceramic article in a firing furnace, which ceramic article will constitute an electronic component.

Firing tool material 1 is produced in the following manner. Fine alumina powder A having a mean grain size of about 0.4 to 3.0 μm, containing plate $Al_2O_3$ grains and having a purity of about 99% or more is admixed with powdery (spherical) fine alumina powder B having a mean grain size of about 0.3 to 2.0 μm and having a purity of about 99% or more in a weight ratio of fine alumina powder A to fine alumina powder B between about 1:9 and 4:6; the resulting mixture is cast and molded using a mold to yield a green compact; and the green compact is fired at a temperature between about 1550° C. and 1750° C. for a predetermined time.

Firing tool material 1 thus produced has a three-layer crystal structure composed of two surface layers and an internal layer sandwiched between the two surface layers. The two surface layers are oriented layers in which crystal grains undergo grain growth in parallel with the surface of the material and are oriented in the direction of the surface and a plurality of layers of crystal grains are laminated.

The internal layer is a fine-grain layer in which crystal grains are fine and dense (FIG. 3).

The crystal grains constituting the surface layer have a mean grain size DA between about 50 μm and 1000 μm and a mean aspect ratio between about 1:3 and 1:10. The crystal grains constituting the internal layer has a mean grain size DB between about 1 μm and 50 μm inclusive.

The thickness of the surface layer is in a range from about 100 to 2000 μm, and the remainder is the thickness of the internal layer. The surface layer grains are substantially parallel to the surface having a degree of preferred orientation of about 0.8 or more (i.e., about 80% or more of the grains are oriented parallel to the surface of the surface layer), and more preferably between about 0.9 and 1.

Firing tool material 1 is obtained by casting and molding plate fine alumina powder A and granular fine alumina powder B using a mold and firing the resulting green compact at a temperature between about 1550° C. and 1750° C. Firing tool material 1 of the present invention is therefore a sintered compact having three-layer structure including two surface layers which are oriented layers formed by grain growth, and an internal layer sandwiched between the two surface layers and being a fine-grain layer composed of fine and dense grains. The surface layers can prevent the absorption of PbO to thereby prevent the strength and creep characteristics of the sintered compact from deterioration. Thus, the life of firing tool material 1 can be prolonged.

As the internal layer sandwiched between the surface layers is composed of fine dense grains, the internal layer can absorb and disperse PbO attached to the grain boundaries of the surface area to thereby prevent the accumulation of PbO in the vicinity of the surface area. This configuration can avoid adverse effects on the quality due to a reaction between PbO or the like and a ceramic article, can prevent peeling and dropping off of crystal grains due to heat cycle, and can improve the reliability of the quality. Additionally, the internal layer absorbs and disperses PbO, and the absorption of PbO is stabilized to thereby uniformize the atmosphere every time when tool material 1 is used. The reliability of the quality can also be improved by this configuration.

The above embodiment is illustrated by taking the case when the alumina sintered compact is used as a firing tool material. However, the application of the invented alumina sintered compact is not specifically limited to the above specific example, and also includes, for example, a refractory material, atmospheric gas supply tube, support tube, radiant tube or other tubes for heat treatment. Specifically, the invented alumina sintered compact can be applied to any matter that is liable to be adversely affected by PbO in firing procedures.

EXAMPLES

The present invention will be illustrated in further detail with reference to several examples and comparative examples below, which are not intended to limit the scope of the invention. In the examples, experiments were performed to verify the advantages of the present invention, and the results are shown below.

TABLE 1

| Sample No. | Weight Ratio Alumina A | Weight Ratio Alumina B | Firing Temperature (° C.) | Thickness (μm) | Surface Layer Mean Grain Size (μm) | Internal Layer Mean Grain Size (μm) |
|---|---|---|---|---|---|---|
| 1* | 10 | 90 | 1750° C. × 5 hr | 300 | 300–500 | 10–30 |
| 2* | 20 | 80 | " | 700 | 400–600 | 20–40 |
| 3* | 30 | 70 | " | 1200 | 400–600 | 30–50 |
| 4 | 50 | 50 | " | 6000 (thickness of box) | 500–800 | — |
| 5 | 100 | 0 | " | no surface layer | — | 10–30 |
| 6 | 50 | 50 | 1500° C. × 5 hr | no surface layer | — | 30–50 |
| 7 | 10 | 90 | 1800° C. × 5 hr | 6000 (thickness of box) | 500–800 | — |

Plate alumina powder A having a mean grain size of 2.2 μm, containing hexagonal plate $Al_2O_3$ grains, and having a purity of 99% or more was wet-mixed with granular alumina powder B having a mean grain size of 0.8 μm, containing granular grains, and having a purity of 99% or more, in the weight ratio indicated in Table 1. The resulting mixed powder was cast and molded in a gypsum mold to form a green compact, and the green compact was fired at a temperature in a range from 1500° C. to 1800° C. for 5 hours to thereby yield a box firing tool material (Samples No. 1 to No. 7) 150 mm wide (w)×75 mm deep (d)×25 mm high (h)×6 mm thick (t) (FIG. 1). Samples No. 1* to No. 3* were examples according to the present invention, Samples No. 4 and No. 5 were conventional examples, and Samples No. 6 and No. 7 were comparative examples. Samples No. 1* to No. 5 were fired at 1750° C., Sample No. 6 was fired at 1500° C., and Sample No. 7 was fired at 1800° C.

Experiment 1

In this experiment, the cross section of bottom 1a (see FIGS. 1 and 2) of each of Samples No. 1* to No. 7 was observed with a scanning electron microscope to determine the thickness and mean grain size of the surface layer and the mean grain size of the internal layer.

In Table 1, Sample No. 4, in which alumina powder A and alumina powder B were mixed in a ratio of 1:1, had the surface layer formed overall in the thickness direction and had no internal layer. This is probably because the ratio of plate alumina powder A was excessively high. Separately, Sample No. 5, in which granular alumina powder B alone was used, naturally had the internal layer alone.

Sample No. 6, in which alumina powder A was mixed with alumina powder B in a ratio of 1:1 and the mixture was fired at 1500° C., had the internal layer alone and no grain growth occurred. This is probably because the firing temperature was excessively low. Sample No. 7, in which powder A was mixed with powder B in a ratio of 1:9 as in Sample No. 1* and the mixture was fired at 1800° C., had the surface layer formed overall in the thickness direction and had no internal layer. This is probably because the firing temperature was excessively high.

In contrast, in each Samples No. 1* to No. 3* according to the present invention, powder A was mixed with powder B in a ratio between 1:9 and 3:7 and the resulting mixture was fired at 1750° C., and the surface layer had a thickness between 300 μm and 1200 μm and had a mean grain size between 300 μm and 800 m, and the internal layer had a mean grain size between 10 μm and 50 μm. These show that satisfactory results can be obtained by setting the weight ratio of alumina powder A to alumina powder B in a range from 1:9 to 3:7 and the firing temperature at 1750° C.

Experiment 2

Alumina powder A and alumina powder B were mixed in the same ratios as in the above samples according to the present invention, and each of the resulting mixtures was molded by dry press molding, wet press molding, extrusion molding, injection molding or doctor blade process to yield a series of sintered compacts. Each of the samples prepared by the above techniques had no crystal structure composed of a surface layer and an internal layer.

Experiment 3

In this experiment, the cumulative PbO absorption of each of Samples No. 1* to No. 5 was determined in the following manner. As shown in FIG. 2, frame top face 1b of tool material 1 was ground, and the opening of tool material 1 was sealed with $Al_2O_3$ dense plate 2, 50 g of a PbO powder was then placed in tool material 1 and the powder was fired at 1300° C. for 2 hours. This cycle was repeated 30 times, and tool material 1 was weighed after each firing procedure to determined the cumulative PbO absorption. The results are shown in FIG. 4.

Figure 4:
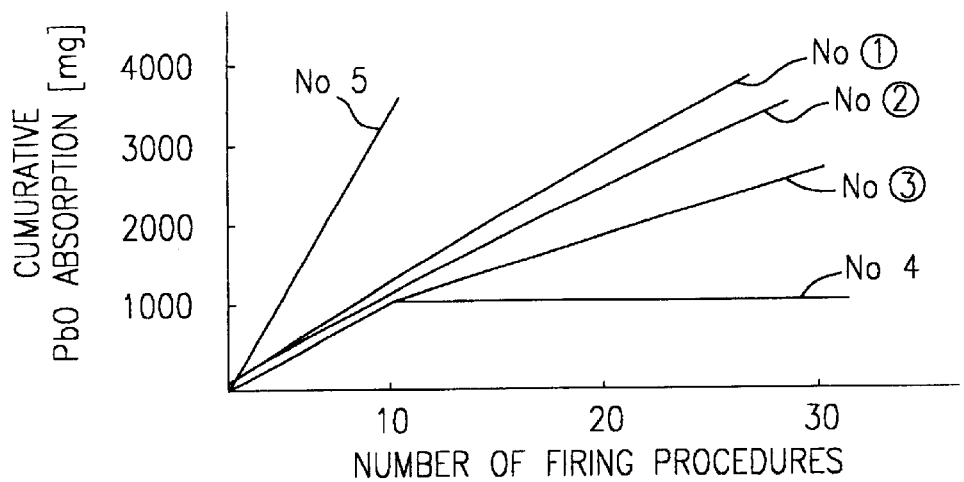
FIG. 4 is a characteristic profile showing the results of an experiment for verifying the advantages of the firing tool material.

FIG. 4 shows that the PbO absorption was high and the tool material became unworkable after about tenth firing procedure in conventional Sample No. 5 having the internal layer alone. In conventional Sample No. 4 in which grain growth occurred overall in the thickness direction, the PbO absorption reached the maximum of 1000 mg after about tenth firing procedure, indicating that repeated firing procedures invited PbO to accumulate in grain boundaries of the surface area.

In contrast, Samples No. 1* to No. 3* according to the present invention having a surface layer and an internal layer exhibited less PbO absorption than Sample No. 5. In these samples, PbO was absorbed in an almost constant amount in every firing procedure. This is because the internal layer absorbed and dispersed PbO accumulated in the surface area.

Experiment 4

In this experiment, a device to be fired containing PbO was placed in each of Samples No. 1* to No. 5 and was fired at 1300° C. for 2 hours, and this cycle was repeated 20 times to determine the absence or presence of a reaction between each sample and the fired device and to observe the appearance of each sample. The results are shown in Table 2.

TABLE 2

| Sample No. | Reaction with Device | Appearance of Sample |
|---|---|---|
| 1* | absent (good) | good |
| 2* | absent (good) | good |
| 3* | absent (good) | good |
| 4 | present (not good) | rough surface, not good |
| 5 | absent (good) | warpage, not good |

Table 2 shows that Sample No. 5 having the internal layer alone exhibited no reaction with the work device as the sample absorbed large amounts of PbO, but the sample was highly deteriorated and warpage and deformation occurred. Sample No. 4 having the surface layer alone reacted with the work device due to large amounts of PbO accumulated in the surface area and its surface crystal grains were peeled and dropped off to exhibit a rough surface.

In contrast, each of Samples No. 1* to No. 3* according to the present invention did not react with the work device and showed a satisfactory appearance, indicating that the internal layer absorbed and dispersed PbO in the surface area.

Experiment 5

The distribution of Pb element between the surface of a bottom wall and the inside of each of Samples No. 1* to No. 5 in Experiment 3 was determined by x-ray intensity analysis. The results are shown in FIG. 5.

Figure 5:
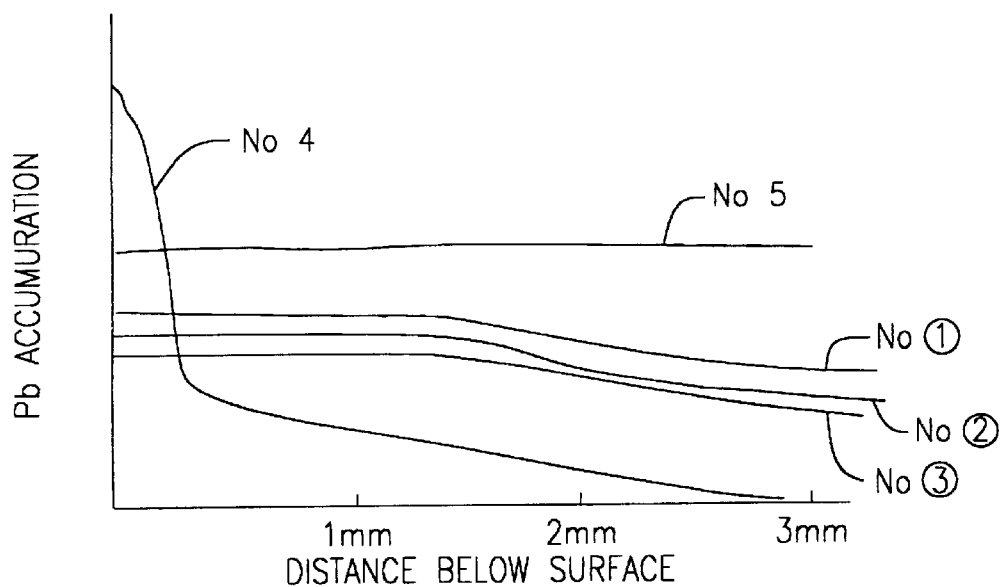
FIG. 5 is a characteristic profile showing the experimental results of the firing tool material.

FIG. 5 shows that, in Sample No. 5 having the internal layer alone, large amounts of Pb accumulated and Pb element distributed nearly constant all the way between the surface and the inside in the thickness direction. In Sample No. 4 having the surface layer alone, Pb accumulated in the vicinity of the surface area. In contrast, each of Samples No. 1*, No. 2* and No. 3* according to the present invention exhibited less Pb accumulation than Sample No. 5 and showed a uniform Pb distribution gradually decreasing from the surface to the inside.

Other embodiments and variations will be obvious to those skilled in the art, and this invention is not to be limited to the specific matters stated above.

What is claimed is:

1. An alumina sintered compact comprising an internal layer and a surface layer on the surface of said internal layer, said internal layer comprising alumina crystal grains of sintered fine alumina powder and said surface layer comprising alumina crystal grains of grain grown fine alumina powder, wherein the mean grain size of said alumina crystal grains of the surface layer is larger than that of said alumina crystal grains of the internal layer.

2. An alumina sintered compact according to claim 1, wherein the alumina crystal grains of said surface layer have a mean grain size between about 50 μm and 1000 μm, and wherein the alumina crystal grains constituting said internal layer have a mean grain size between about 1 μm to 50 μm.

3. An alumina sintered compact according to claim 2, wherein said surface layer has a thickness between about 100 μm and 2000 μm.

4. An alumina sintered compact according to claim 3, wherein the alumina crystal grains of said surface layer are oriented in a layer substantially parallel to the surface of said surface layer.

5. An alumina sintered compact according to claim 4, wherein the alumina crystal grains of said surface layer have an aspect ratio between about 1:3 and 1:10.

6. An alumina sintered compact according to claim 5, wherein the alumina crystal grains of said surface layer have a mean grain size between about 300 μm and 600 μm, the alumina crystal grains constituting said internal layer have a mean grain size between about 10 μm to 50 μm, and said surface layer has a thickness between about 300 μm and 1200 μm.

7. An alumina sintered compact according to claim 6 configured in the form of a heat treatment firing jig for a ceramic article.

8. An alumina sintered compact according claim 7 in combination with a ceramic article which contains lead oxide.

9. An alumina sintered compact according to claim 1, wherein the alumina crystal grains of said surface layer are oriented in a layer substantially parallel to the surface of said surface layer.

10. An alumina sintered compact according to claim 9, wherein the alumina crystal grains of said surface layer have an aspect ratio between about 1:3 and 1:10.

11. An alumina sintered compact according to claim 1 configured in the form of a heat treatment firing jig for a ceramic article.

12. An alumina sintered compact according claim 11 in combination with a ceramic article which contains lead oxide.

* * * * *